(12) United States Patent
Gupta et al.

(10) Patent No.: US 9,001,989 B2
(45) Date of Patent: Apr. 7, 2015

(54) SYSTEM AND METHOD FOR A SMART DIALER

(75) Inventors: Shekhar Gupta, Overland Park, KS (US); Robert J. Morrill, Overland Park, KS (US); David E. Rondeau, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1304 days.

(21) Appl. No.: 12/185,650

(22) Filed: Aug. 4, 2008

(65) Prior Publication Data
US 2010/0027777 A1 Feb. 4, 2010

(51) Int. Cl.
H04M 3/00 (2006.01)
H04M 3/42 (2006.01)

(52) U.S. Cl.
CPC .... H04M 3/42195 (2013.01); *H04M 2203/551* (2013.01)

(58) Field of Classification Search
CPC .................................................. H04M 3/42195
USPC ............... 379/210.01, 88.17, 201.01, 202.01, 379/265.01
See application file for complete search history.

(56) References Cited

U.S. PATENT DOCUMENTS

| 3,818,352 | A | 6/1974 | Moran | |
|---|---|---|---|---|
| 6,101,480 | A | 8/2000 | Conmy et al. | |
| 6,760,423 | B1 * | 7/2004 | Todd | 379/202.01 |
| 6,956,623 | B1 | 10/2005 | Staller | |
| 8,041,765 | B1 * | 10/2011 | Krishnaswamy et al. | 709/204 |
| 2002/0196910 | A1 * | 12/2002 | Horvath et al. | 379/88.01 |
| 2003/0142809 | A1 * | 7/2003 | Coffey | 379/265.01 |
| 2005/0169443 | A1 * | 8/2005 | Rosenthal | 379/88.17 |
| 2007/0133771 | A1 * | 6/2007 | Stifelman et al. | 379/142.01 |
| 2008/0075251 | A1 * | 3/2008 | Jefferson et al. | 379/142.07 |
| 2008/0147818 | A1 * | 6/2008 | Sabo | 709/206 |
| 2008/0165944 | A1 * | 7/2008 | Rosenthal et al. | 379/202.01 |
| 2011/0222679 | A1 * | 9/2011 | Tal et al. | 379/211.01 |

FOREIGN PATENT DOCUMENTS

| EP | 1 791 354 | 5/2007 |
|---|---|---|
| WO | WO 01/95616 A3 | 12/2001 |

OTHER PUBLICATIONS wwwen.zte.com, "IPTV—Building a Bridge through Communication", 3 pgs., copyright 1985-2008 ZTE Corporation.
www.Reuters.com, "Shanghai's Oriental Cable Network Selects Cisco to Deploy First ROADM Networking Technology in Mainland China" 3 pgs., Jan. 17, 2008.
www.sysmaster.com, "Tornado M10 Digital Media Center", 3 pgs., copyright 2001-2008 Sysmaster Corp.
Ishikawa, N. et al, "The design of a set-top box with video encoder and its application to video conferencing", 2 pgs., May 1998 (CAT. INIST).

(Continued)

*Primary Examiner* — Sonia Gay
(74) *Attorney, Agent, or Firm* — Swanson & Bratschun, L.L.C.

(57) ABSTRACT

A system and method for coordinating communications. User selection of multiple contacts from an address book are received. The user selection of multiple contacts are added to a contact schedule. The multiple contacts listed in the contact schedule are automatically called. A voice communication is initiated in response to a receiving party answering a call. A message specified by a user is sent to the receiving party in response to the receiving party not answering the call.

19 Claims, 6 Drawing Sheets

(56) References Cited

OTHER PUBLICATIONS

Whitepapers.zdnet.com, "Cable Network Builds Interactive Television Application on Cutting-Edge Technology", 3 pgs., Aug. 8, 2008.

"Programming Your VCR to Automatically Change Channels to Record a Program", 3 pgs., http://www.comcast.com/images/ImageLibrary/FAQ/PDF/Programming%20Your%VCR%20to%20Automatically%20Change%20and%20Record%20Channels.pdf.

* cited by examiner

SYSTEM AND METHOD FOR A SMART DIALER

BACKGROUND

The use of and development of communications has grown nearly exponentially in recent years. The growth is fueled by larger networks with more reliable protocols and better communications hardware available to service providers and consumers. Users have similarly grown to expect better communications from home, work, and on the go.

Users now expect added features that provide greater functionality and convenience for voice communications. In particular, the methods for calling, responding, or sending communications to various contacts are still quite limited to traditional methods, configurations, and setups.

SUMMARY

One embodiment provides a system and method for coordinating communications. User selections of multiple contacts may be received from an address book. The user selections of multiple contacts may be added to a contact schedule. The multiple contacts listed in the contact schedule may be automatically called. A voice communication may be initiated in response to a receiving party answering a call. A message may be delivered in response to the receiving party not answering the call.

Another embodiment may provide a system for implementing a contact schedule. The system may include a portal application configured to automatically present one or more contacts from received communications to a user for addition to a contact schedule. The portal application may also receive a user selection of multiple contacts to add to the contact schedule. The portal application may be configured to determine a category of communication for each of the multiple contacts. The system may also include a trigger in communication with the portal application configured to initiate a call to a receiving party included in the multiple contacts. A message of the category may be sent to the receiving party in response to the trigger determining the receiving party is not answering the phone.

Yet another embodiment may provide a server configured to implement multiple communications. The server may include a processor for executing a set of instructions and a memory in communication with the processor that may be configured to store the set of instructions. The set of instructions may be configured to automatically insert one or more contacts in a contact schedule based on received communications, receive a user selection of multiple contacts from a network address book, add the user selection of multiple contacts to the contact schedule, determine a category of communication for each of the multiple contacts, automatically call the multiple contacts listed in the contact schedule selected for voice communications, and automatically send a message to the multiple contacts listed in the contact schedule selected to receive a message.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for communicating with one or more receiving parties. Calls or messages may be communicated based on pre-established selections by a user that are compiled in a contact schedule. The contact schedule is a compilation of scheduled communications. The communications may include a live call or pre-recorded voice, text, or other data messages and may also be referred to as a call list.

Figure 1:
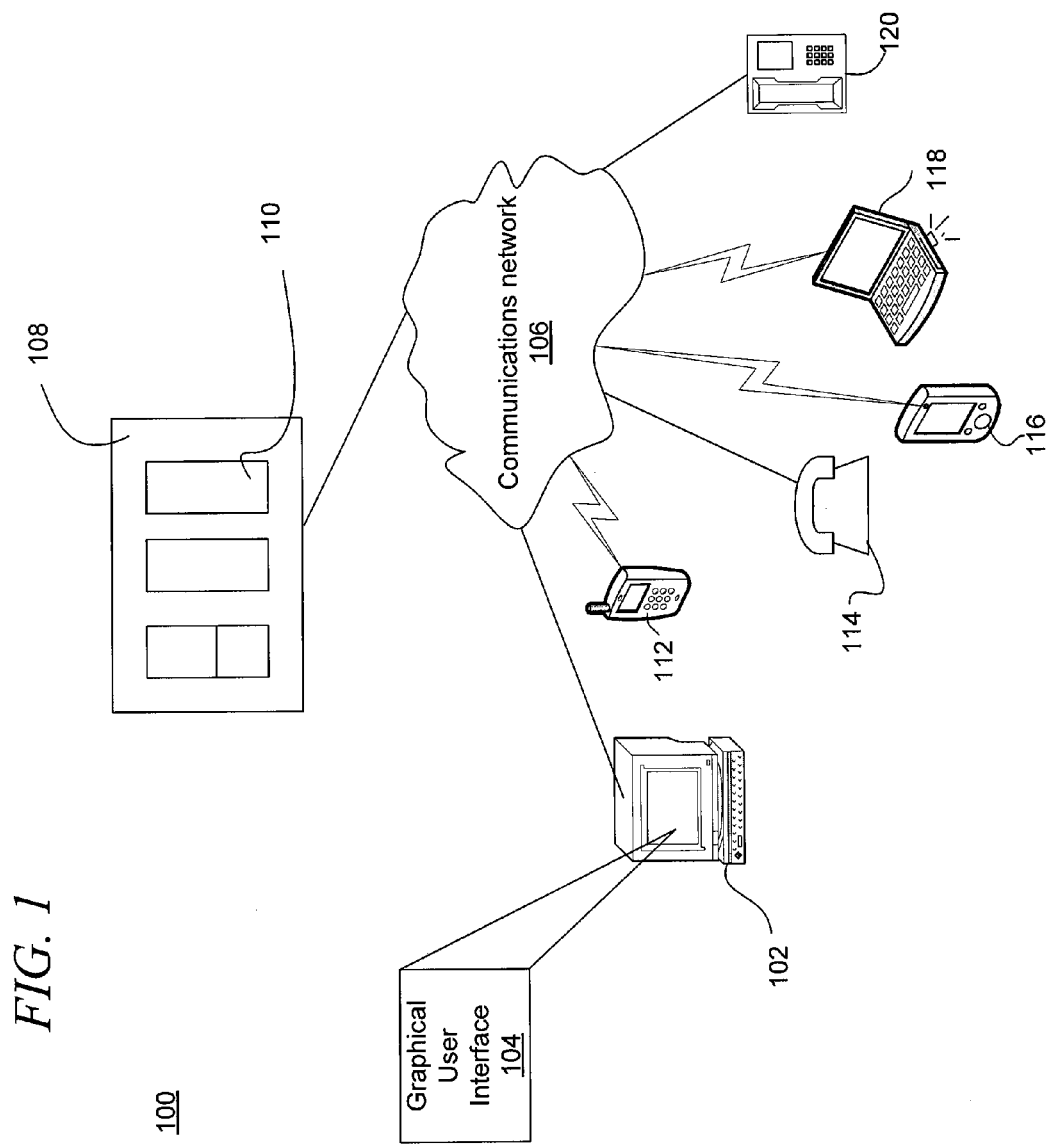
FIG. 1 is a pictorial representation of a communications environment in accordance with an illustrative embodiment.

FIG. 1 is a pictorial representation of a communications environment in accordance with an illustrative embodiment. FIG. 1 describes one embodiment of a communications environment 100. The communications environment 100 is the setting for initiating one or more voice communications or messages through a contact schedule. Voice communications or messages may include calls through plain old telephone service (POTS), calls through Voice over Internet Protocol (VoIP), emails, text messages, chat sessions, video mail, or other forms of electronic communication. The communications environment 100 may include a personal computer 102, a graphical user interface (GUI 104, a communications network 106, a communications management system 108, a server 110, a cell phone 112, a home phone 114, a personal digital assistant (PDA) 116, a laptop computer 118, and a VoIP phone (VoIP) 120.

The different elements and components of the communications environment 100 may communicate using wireless communications including satellite connections and/or hard-wired connections, such as fiber optics, T1, cable, DSL, high speed trunks, and telephone lines. Communications within the communications environment 100 may occur on any number of networks which may include wireless networks, data or packet networks, cable networks, satellite networks, private networks, publicly switched telephone networks (PSTN), a wired network, or other types of communication networks. The communications network 106 is the total infrastructure for sending and receiving signals and messages according to one or more designated formats, standards, and protocols. The networks of the communications environment 100 may represent a single communications service provider or multiple communications service providers. The features, services, and processes of the illustrative embodiments may be implemented by one or more elements of the communications environment 100, independently or as a networked implementation.

The communications network 106 or communications management system 108 may include an authentication space. The authentication space may be a partition, module, or other storage or memory of the server 110 designated by the communications service provider. The authentication space may validate that a user or device, such as the personal computer 102, is allowed to authorize the communications network 106, communications management system 108, servers 110, switches, network devices, or a corresponding network address book to access a web portal, set preferences, implement changes, review information, or perform other updates. For example, a user may first be required to provide a secure identifier, such as a user name, password, or other authentication code or hardware interface, to verify the user is authorized to access the network address book and make communications with contacts from the address book within the authentication space.

The authentication information may be also used to create a secure connection between the personal computer 102 and the communications network 106. The secure connection may be a virtual private network tunnel, an encrypted connection, firewall, or other form of secured communications link. The personal computer may be any type of personal computing device and is not limited to a traditional laptop or desktop computer.

Figure 6:
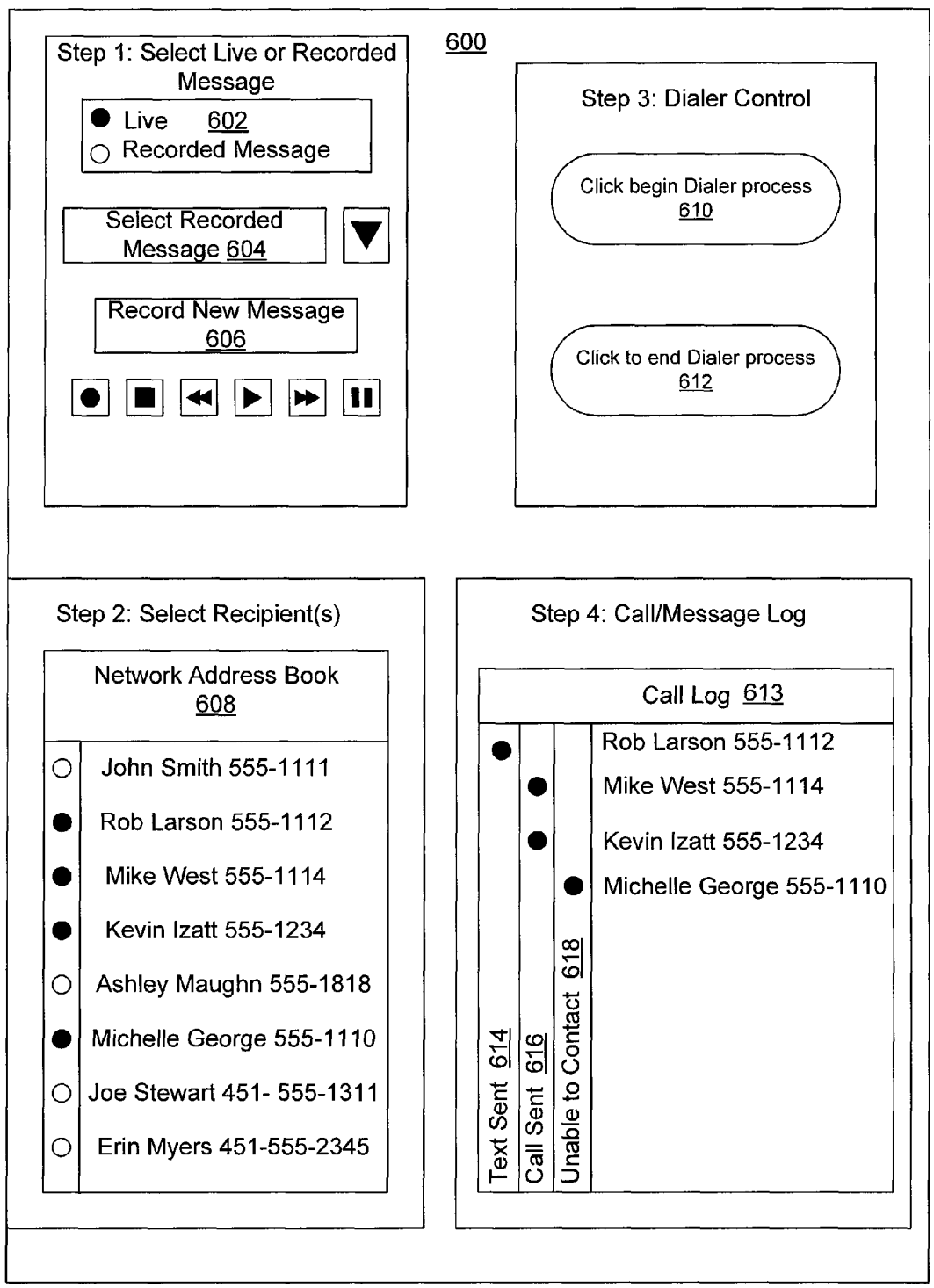
FIG. 6 is a pictorial representation of a user interface in accordance with an illustrative embodiment.

The computer 102 may be a personal computer, a laptop, or any other electronic device suitable to send and receive voice communications and messages, written or recorded, and import contacts from a network address book, corporate address book, global address book, or other linked communication devices. In another embodiment, contacts may be stored locally in an address book. The personal computer 102 may feature the GUI 104 suitable for implementing and storing communications from an application or web port1 as shown in FIG. 6. The computer 102 may include a microphone for recording a voice message or other communications.

The GUI 104 may be a portal application that may allow a user to categorize, prioritize, and call or send messages to contacts from an address book or numbers retrieved from a messaging system. For example, the portal application may be set to retrieve numbers or email addresses for communications missed while the user is in a meeting. The user may also specify how missed communications may be prioritized for call backs. For example, the user may specify numbers grouped together as business contacts have the highest priority, after the business contacts numbers grouped as personal contacts may be dialed or sent messages. The GUI 104 may also be used to conveniently access all missed communications from multiple devices at a single location. For example, after a meeting a user may simply check their computer to view any messages missed on their office phone, cell phone, as well as missed emails.

The personal computer 102 may be connected to a communications network 106. The communications network 106 is made up of equipment suitable for directing communications to a specified location or device. The communications network 106 may provide a wired or wireless connection to the various devices and elements of the communications environment 100. The connection may be a standard analog connection, a VOIP connection, a WiFi connection, or any other suitable connection.

The communications network 106 may include or be linked to a communications management system 108. The communications management system 108 is one, or more devices utilized to enable, initiate, route, and manage communications between one, or more telephonic devices. The communications management system 108 may include one, or more devices networked to manage the communications network 106. For example, the communications management system may include any number of servers 110, routers, switches, or advanced intelligent devices.

The communications network 106 sends and receives the electronic signals through any number of transmission mediums. The communications network 106 may include various fiber optics, cables, transmission towers, antennas, or other elements for transmitting voice communications to the connected telephonic devices. In one embodiment, the communications management system 108 and the communications network 106 work to transmit voice communications to the VoIP phone 120. However, the communications network 106 and management system 108 may enable plain old telephone service (POTS), wireless service, or other forms of voice communications.

The server 110 is a computing device and software that allows a user to store and categorize contacts in an address book, store voicemail, messages and other information, and deliver the information to other devices according to user preferences, such as a cell phone 112, a home phone 114, a personal digital assistant (PDA) 116, a laptop computer 118, or a VoIP phone 120. In one embodiment, the server 110 may function locally from the personal computer 102. The server 110 may also be a device utilized by the communications network 106 or the communications management system 108. The server 110 may also function as a stand-alone or distributed entity within the network.

The communications network 106 may provide a wireless connection for a cell phone 112, PDA 116, or laptop 118. Incoming communications to each of the communications devices in the communications environment 100 may be routed to or logged by the personal computer 102. In another embodiment, only missed communications or communications with no initiated reply may be routed to the personal computer for response via a portal application.

The home phone 114 and VoIP phone 120 may utilize a wired connection to the communications network 106. The home phone 114 and VoIP phone 120 may include a wireless phone and a femto cell baste station, cordless phones and a base station, digitally enhanced cordless telephones (DECT), or WiFi enabled phones. Incoming communications to these devices may be routed to the personal computer 102. In another embodiment, missed communications are copied to the personal computer 102 for response via a portal application.

Figure 2:
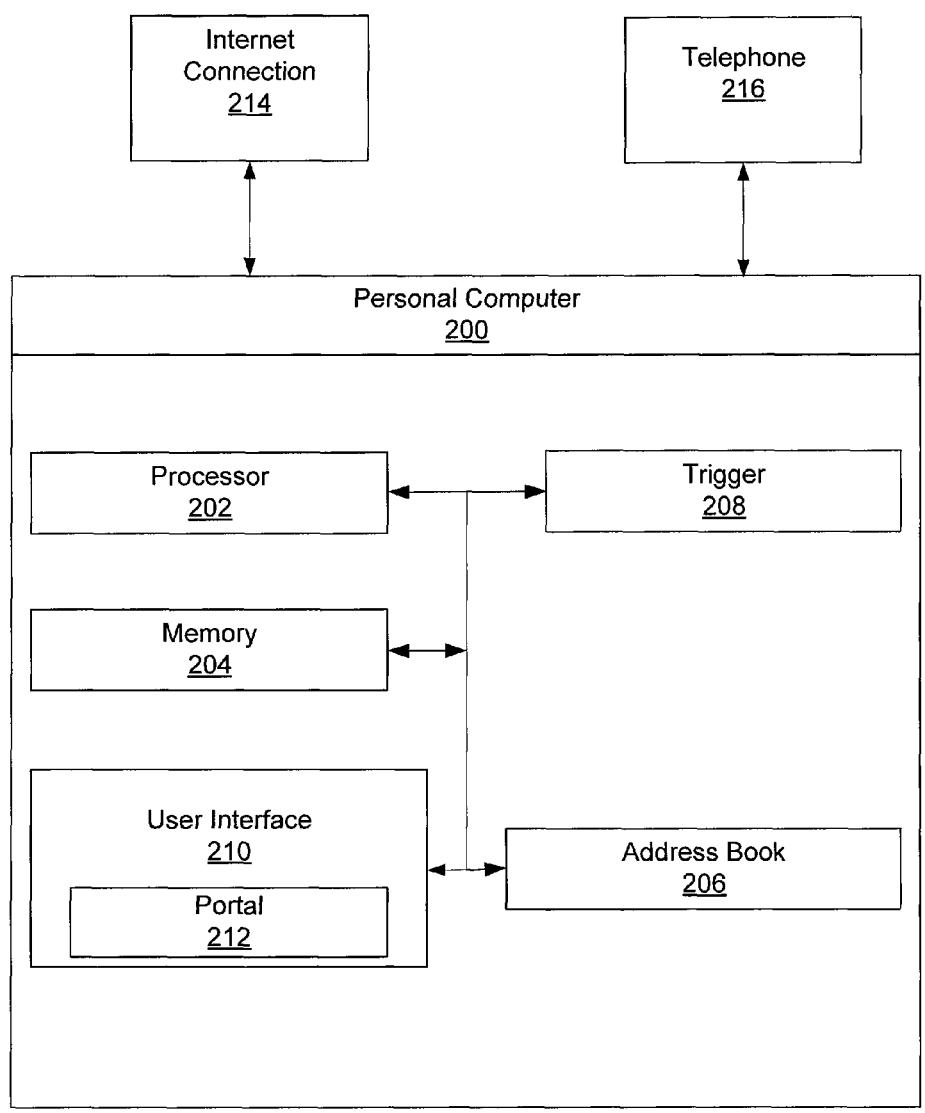
FIG. 2 is a block diagram of a personal computer with phone and internet connections in accordance with an illustrative embodiment.

FIG. 2 is a block diagram of a personal computer with phone and Internet connections in accordance with an illustrative embodiment. The personal computer 200 may include a processor 202, memory 204, an address book 206, a trigger 208, a user interface 210, a portal 212, an Internet connection 214, and a telephone 216. As previously described, the personal computer 200 may locally store the portal 212. In another embodiment, the portal 212 may be accessible through the Internet connection 214 and the components and modules of the personal computer 214 may be integrated with one or more servers or intelligent network devices.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs and applications, converting and processing signals and information, and performing other related tasks. The processor 202 may be a single chip or integrated with other computing or communications elements.

The memory 204 is a hardware element, device, or recording media configured to store data, messages, and/or communications for subsequent retrieval or access. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums. The memory 204 may store or queue numbers or identifiers for incoming communications that are missed. In another embodiment, the memory may also store any messages or other missed communications and allow the user to access all missed communications from a single, convenient location.

The address book 206 is a program, database, or module for managing names; email addresses, phone numbers, and other contact-related information. The address book 206 may be stored locally on the personal computer 200 or it may be a network, organizational, or global address book accessible through the Internet connection 214. For example, the network address book may be shared between multiple communications devices. The address book 206 may include multiple call or message lists. The lists may be used to sequentially or concurrently communicate with each contact in the list. The lists may be labeled or named for identification purposes. The lists may be saved to be utilized multiple times.

The trigger 208 is a component or module that initiates communications to contacts stored in the address book 206, manually entered numbers, or missed calls. The trigger 208 may be circuitry, a switch, communications logic or a dialer. In another embodiment, the trigger 208 is a messaging application and logic that initiates and implements voice and data communications. In one embodiment, the trigger 208 may initiate calls through the personal computer using VoIP technology. A call may be initiated by the trigger 208 to be subsequently linked to the telephone 216 to complete the call. The trigger 208 may dial one or more contacts initially before connecting the call to one or more other devices, such as the telephone 216.

In one embodiment, the address book 206, trigger 208, user interface 210, and portal 212 or other add-ons may be integrated with a email application. The email application may be configured to compile, manage, and multiple contact schedules. In one embodiment, the email application may automatically add contacts from received communications to a contact schedule. In particular, the email application may determine whether there are missed calls, unopened emails, text messages, and chat messages or other communications that the user may seek to respond to. For example, the user may be presented with a pre-established contact schedule for all applicable missed messages for a twenty four hour time period. Received communications may be flagged to be added to the contact schedule. In one embodiment, the email application or portal 212 may also be configured to search received communications for phrases, such as "call me", "let me know when you are back in your office", "my phone number is . . . ". The email application may search text messages as well as using voice recognition to search for a number of indicators.

In another embodiment, the trigger 208 may work in conjunction with the user telephone 210 and portal 212 to receive one or more messages for delivery to the group. The trigger 208 may include accessing logic for transmitting any number of messages. The trigger 208 may be configured to attempt different types of communication, if there is no answer, return receipt, or acknowledgment. For example, a phone call may be attempted, if no answer, a recorded voice message may be sent. If that is not received, email, text, and chat messages may be sent until confirmation of at least one of the messages is verified.

The user interface 210 may receive user preferences through portions of a touch screen, buttons, hard keys, interactive voice response system, accelerometers, voice recognition software, soft keys, scroll wheels, track ball, commands, or other interactive elements. The user interface may include a portal 212. The portal 212 is a site on the Internet that allows a user to view information from different sources in a unified way. The portal 212 may also be accessible through multiple platforms such as personal computers, cell phones, PDAs, or laptop computers. The portal may feature commands or interactive elements to allow users to input their preferences for sending and receiving communications. In one embodiment, a user may select a number of contacts to call or send a message at a selected time.

The Internet connection 214 may enable the personal computer 200 to receive contact information, calls, and messages from multiple sources. The Internet connection 214 may also enable email, information, text messages, and VOIP communications to be sent.

The telephone 216 may be utilized to initiate calls in a sequence determined by user preferences and configuration through the portal 212. The telephone 216 may receive contact information from the personal computer 200 and receive a dialing command from the trigger 208. For example, the telephone 216 may be used to inform a youth group of the cancellation of an activity simultaneously or sequentially.

In another embodiment, the portal application which may include a user interface, network address book, and announcement recording modules, as well as, a separate or integrated calendar notification, may be accessible through a Enterprise Service Bus (ESB) or Business Process Management (BPM) application or middleware. A unified user profile may allow the user to access any number of corporate, organizational, or network databases, directories, and address books.

The ESM may communicate utilizing packet based communication, such as a session initiation protocol (SIP) servlet that provides media server control, call control, messaging, signaling control and web services for implementing the communications features as herein described. For example, the user may be able to access the SIP servlet through the portal 212 in order to generate a call list, start a live call, create a message recording, or enter a message type and message. In one embodiment, the signaling control of the SIP servlet may communicate with a number of media servers, VoIP soft switches, networks, PSTN, or other elements. The web services of the SIP servlet may communicate with short message service (SMS) and email messaging services, as well as, one or more calendar programs.

Figure 3:
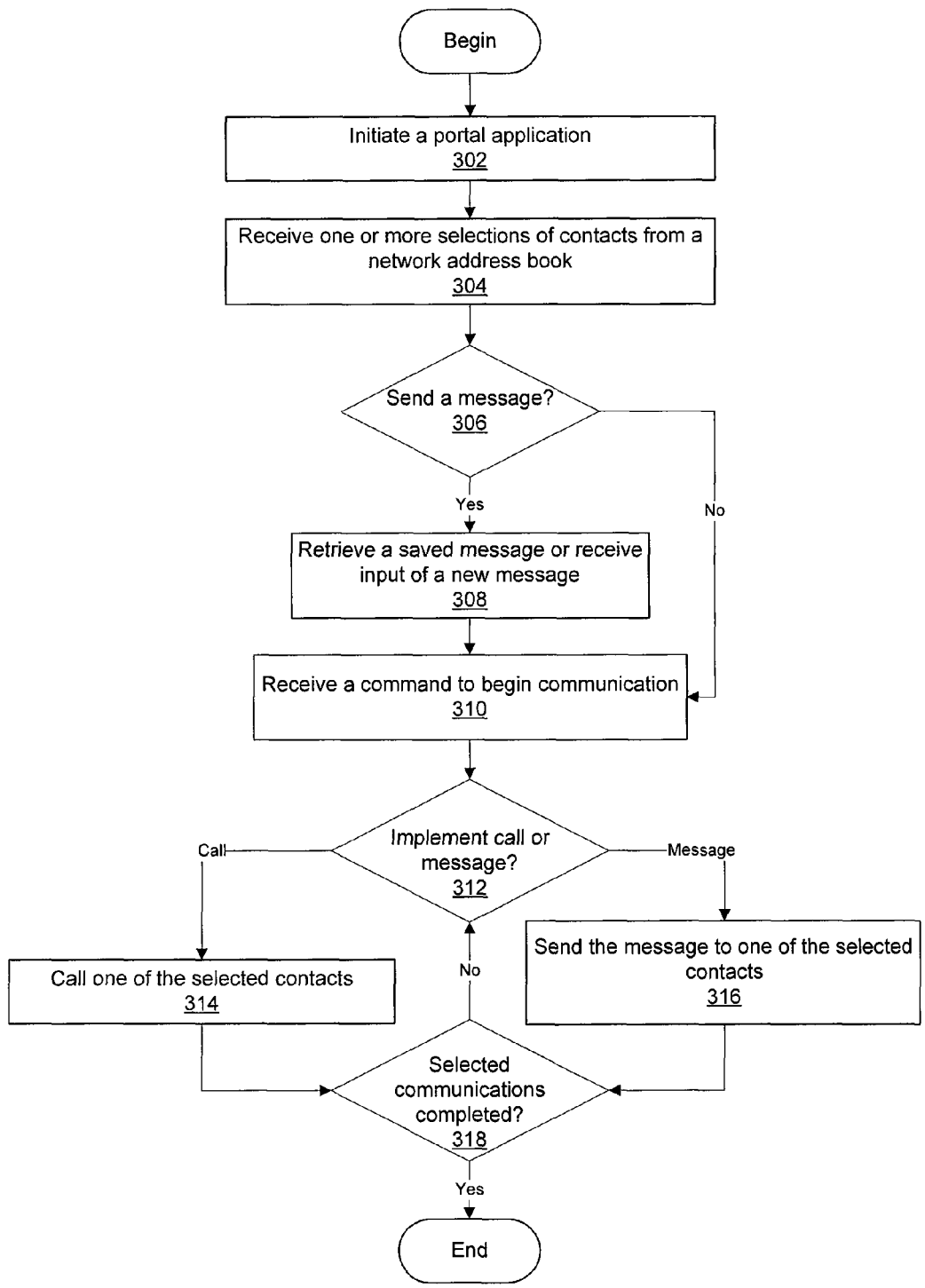
FIG. 3 is a flowchart of a process for initiating communications through a web portal in accordance with an illustrative embodiment.
Figure 4:
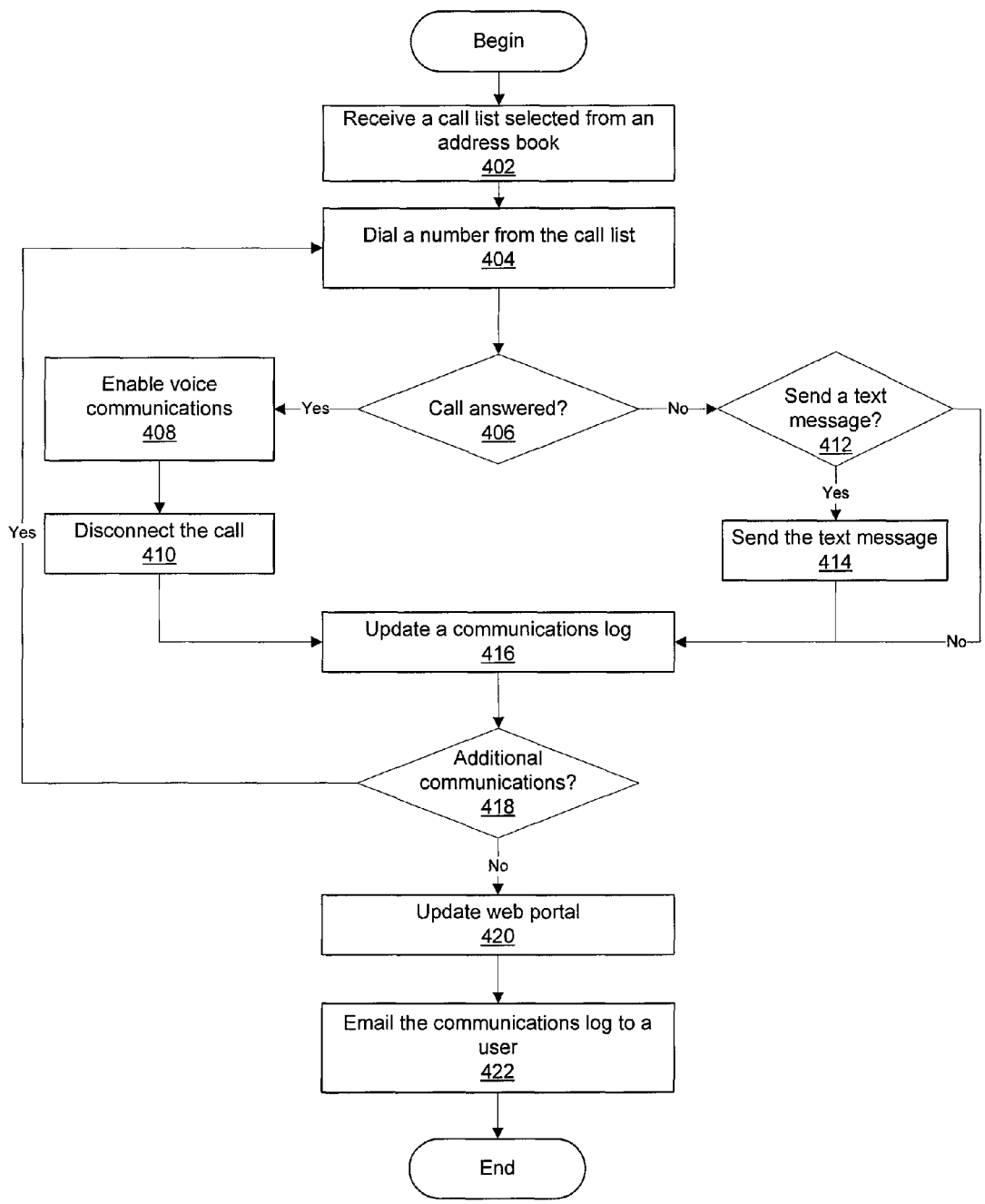
FIG. 4 is a flowchart for a process of initiating a voice communication through a web portal in accordance with an illustrative embodiment.
Figure 5:
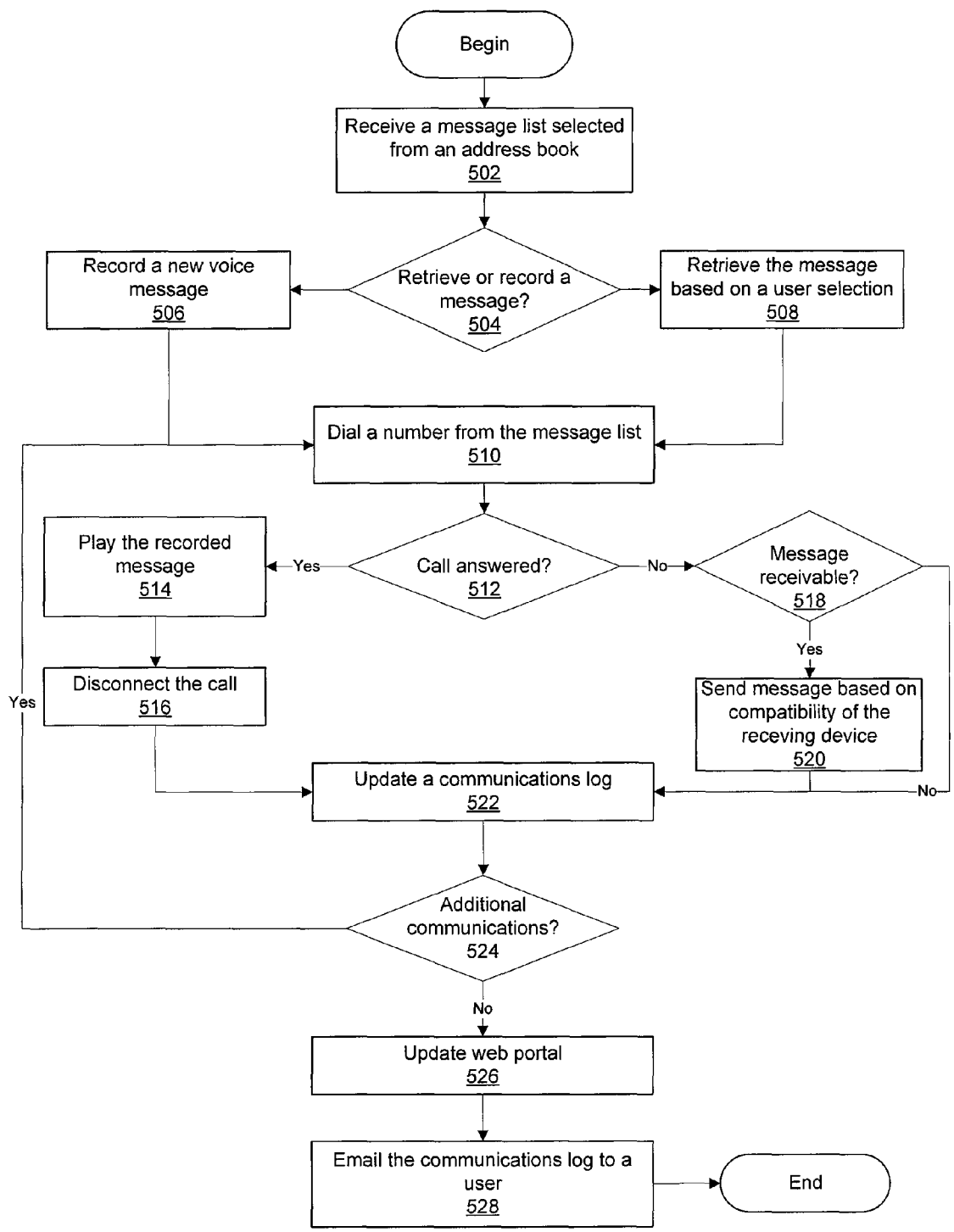
FIG. 5 is a flowchart for a process of initiating messages through a web portal in accordance with an illustrative embodiment.

FIG. 3 is a flowchart of a process for initiating communications through a web portal in accordance with an illustrative embodiment. The process of FIG. 3 may be implemented by a client device executing a portal application. The portal application may be a website accessed externally or may be a locally stored application. In FIGS. 3-5 the contact schedule may be referred to as one or more contacts, a contact list, and a message list.

The process may begin by initiating a portal application (step 302). In one embodiment, the portal application may be initiated by selecting an icon, opening a program, or accessing a database. For example, the portal application may be a web page that allows a user to send and receive communications from multiple devices from a single location, such as a home and wireless computer accessible from the user's home.

Next, the portal application may receive one or more selections of contacts from a network address book (step 304). The selections may be placed into groups or categories and prioritized for a communication sequence. For example, contacts may be grouped into business, personal, missed calls, or missed messages for sending distinct communications at a time selected by the user. The groups may also be selected according to the outgoing communication type. For example, priority may be given to missed communications first, followed by business communications, and then personal communications. However, at any time a user may manually select a contact to initiate a scheduled or unscheduled communication.

In another embodiment, all or a portion of the one or more selections for a communication sequence may be automatically populated based on missed calls, calendar appointments, and pre-established preferences. For example, the portal application may prioritize missed calls as a highest priority followed by designated weekly sales calls, and one or more conference calls that may be scheduled at any time. For exampled, received communications may be searched for text or verbal indicators that the user should call or send a message to a specified party. Missed communications may be flagged to be added to the contact schedule Next, the portal application determines whether to send a message (step 306). The determination of step 306 may be made based on user input. In one embodiment, the user may select to respond to missed communications utilizing messages rather than live calls. Individual selections of a communication or response type may be made for each individual of the group that is included in the communication sequence.

If the portal application determines to send a message, the portal application retrieves a saved message or receives input of a new message (step 308). The messages may include recorded voice messages, text messages, chat or instant messages, or email messages. In one embodiment, the user may have previously entered the message in the portal application. In another embodiment, a previously entered or stored message may be retrieved or imported from a specific location or application, such as a draft folder of a local email program. The user may also record a new voice message utilizing a microphone, voice recognition hardware and/or software, or other input devices, modules, or peripherals.

Next, the portal application may receive a command to begin communication (step 310). The command of step 308 may be entered to begin a communication sequence. The command may be received through a radio button, icon, voice command, touch screen, or other selection of the portal application. If the portal application determines not to send a message in step 306, the portal application may also receive a command to begin communication (step 310). At any time, the user may end the communications or the process of FIG. 3.

After receiving the command to begin communication in step 310, the portal application determines whether to implement a call or message (step 312). In one embodiment, the determination of step 312 may be made based on a previously received user input or selection. For example, the selection may have been previously received to make the determination of step 306. If the portal application determines to implement a call, the portal application calls one of the selected contacts (step 314). The calls may begin with the highest priority number from the selected group or communications sequence. A notice or alert may indicate that the call is being initiated in order to inform the user.

Next, the portal application determines whether the selected communications are completed (step 318). The determination of step 318 may end the process if all selected communications are determined to be completed. If the portal application determines the selected communications are not completed in step 318, the portal application may again determine whether to implement a call or message (step 312) for the next contact of a list, sequence, or user selection. The portal application may utilize signaling interactions with the switch to determine when the called line is again available to receive a call. For example, if a contact or receiving party and the phone line is busy, the portal application may redial the contact once the line is available.

The determination of step 318 may also include a pause or interval before calling, or attempting to call, the selected contacts in step 314. For example, the user may specify that calls are initiated every thirty minutes or at least five minutes after the previous call ended in order to allow the user to prepare or accomplish other tasks. The interval, spacing, or time period between communications may be specified by user preferences or selections. If all communications are not completed, the portal application may continue to monitor numbers that were not contacted because the line was busy. Once the line is no longer busy, the portal application may begin again at step 312 and call the open line. The portal application may use any number of "camp-on" or redial features.

If the portal application determines to implement a message in step 312, the portal application sends the message to one of the selected contacts (step 316). The message may be sent using any number of messaging formats. In particular, the message may be sent as an email, chat, or text message to the contacts. The portal application may be configured to communicate with the selected contacts through a sequence of communication types. For example, a contact may be called first, if the call is not received, the portal application may send a pre-determined email, if no response is received for the email, the portal application may send a pre-determined text message. The portal application may be user configured to attempt the communications in a specific manner. For example, by telephone first, by email next, by text message, etc. Next, the portal application determines whether the selected communications are completed (step 318).

The process of FIG. 3 may repeat a number of times for both calls and messages to the selected contacts.

FIG. 4 is a flowchart for a process of initiating a voice communication through a web portal in accordance with an illustrative embodiment. The process of FIG. 4 may be implemented by a client device executing a portal application. The process may begin with the portal application receiving a call list selected from an address book (step 402). The call list may be selected from different groups and be prioritized according to user preferences. In another embodiment, the call list may be compiled from missed communications. For example, the user may add missed communications of contacts stored in the address book to the call list. As a result, unlisted callers or calling parties that are not included in the address book may not be added to the call list unless individually selected by the user. Call lists may be saved and given descriptions for ease of future use. For example, a user may create a call list for the purpose of telling members of a baseball team that the game is cancelled due to rain. The user may save the list as "softball team" and/or may label the list as "game cancellation" call.

Next, the portal application dials a number from the call list (step 404). The portal application may work through the call list based on an associated priority in order to attempt communications with each of the selected contacts on the call list. Once the number is dialed, a determination is made if the call is answered (step 406).

If the portal application determines the call is answered, the portal application may initiate voice communications (step 408). In one embodiment, the call may be transferred or connected to a phone as part of the initiation of step 408. At the end of the voice conversation, the portal application disconnects the call (step 410). The end of the call may be based on either of the calling parties ending the call. For example, the caller may hang up the phone. Once the communication is completed, the portal application updates a communications log (step 416). The communications log may be a portion of the portal application that allows a user to view all completed communications. For example, the communications log may list the type of communication call or message, time the communication was initiated, and the communication duration.

If the portal application determines the call is not answered in step 406, the portal application may determine whether to send a text message or not (step 412). The determination of step 412 may be made based on user input or the ability of the user to receive text messages. For example, the receiving parties' home phone may not be configured to receive text messages. The text message of FIG. 4 may also include an email, instant message, or other message.

If the portal application determines to send a text message, the portal application sends the text message (step 414). The user may also set a message hierarchy for sending one or more different message types based on an unsuccessful delivery of a message for any number of reasons. If the portal application determines not to send a text message in step 412 or after sending the text message (step 414), the portal application updates a communications log (step 416). For example, the communications log may record the content, receiving parties, and other details of the text message for reference by a user. Next, the portal application determines whether there are additional communications (step 418). Additional communications may be individuals or devices on a call list that have not been contacted. If the portal application determines there are additional communications, the portal application returns to dial a number from the call list (step 404).

If the portal application determines there are not additional communications in step 418, the portal application updates the web portal (step 420). The web portal may be updated by recording the communications and actions taken. For example, the communications log may be uploaded into a database for access by the user. Calls and messages may be recorded as a reference for the user. Next, the portal application emails the communications log to a user (step 422). The user may store the call log for future records or as a reference for the communications completed or attempted.

FIG. 5 is a flowchart for a process of initiating messages through a web portal in accordance with an illustrative embodiment. The process of FIG. 5 may be implemented by a client device executing a portal application. The process may begin with the portal application receiving a message list selected from an address book (step 502). The message list may be selected according to message type and the capabilities of the devices and services available to the contacts included in the message list. For example, the message list may include devices or contacts that are capable of receiving short message service (SMS) or multi-media services (MMS). The message list may also be a previously created list with a short description. For example, the message list may be titled "co-workers" and have the description "meeting information" for transmitting an email. The user could use the message list as a template each time a meeting was scheduled and configure the email to communicate updated information.

Next, the portal application determines whether to retrieve or record a message (step 504). The determination of step 504 may be made based on user input. For example, the user may select to retrieve or record a message or may have pre-selected a message. If the portal application determines to record a message, the portal application records a new voice message (step 506). The message may be recorded utilizing a microphone or similar input device.

If the portal application determines to retrieve a message in step 504, the portal application retrieves the message based on a user selection (step 508). The message of step 508 may have been previously recorded. For example, a user may select an often used message such as a voice recording that reminds colleagues that a meeting starts in fifteen minutes.

Next, the portal application dials a number from the message list (step 510). The number may be a phone number, Internet Protocol (IP) address, username, or other identifier. The portal application determines whether the call is answered (step 512). The determination of step 512 may be made based on whether a user answers the call. For example, the call may be deemed to be answered if a user answers the call, rather than an answering machine or voicemail system. In another example, playing the recorded message to an answering service may be acceptable. If the call is answered, the portal application plays the recorded message (step 514). The call being answered may allow the recorded message to be played or received by the selected contact. The portal application disconnects the call (step 516) at the end of the call.

If the portal application determines the call is not answered in step 512, the portal application determines whether the message is receivable (step 518). The determination of step 518 may be made based on a database of contacts, sending a test message to the contact, or based on other information. If the portal application determines the message is receivable, the portal application sends the message based on the compatibility of the receiving device (step 520). In one embodiment, the portal application may convert the message type to a format, protocol, or standard compatible with the recipient device. For example, a .wav file may be converted to an mp3 file. The process of sending messages through the portal application may allow the user to send out a message to multiple contacts simultaneously. For example, the user may be able to send a mass voice message to friends informing them of a location for a party.

After steps 516, 520, or determining a message is not receivable in step 518, the portal application updates a communications log (step 522). The updated communications log may be a database, record, memory, or a portion of the portal application that allows a user to view all completed communications.

Next, the portal application determines whether there are additional communications (step 524). If the portal application determines there are additional communications, the portal application again dials a number from the message list (step 510). If there are not additional communications in step 524, the portal application updates a web portal (step 526). Next, the portal application emails the communications log to a user (step 528). The user may store the call log for future records.

FIG. 6 is a pictorial representation of a user interface in accordance with an illustrative embodiment. FIG. 6 illustrates one embodiment of a user interface 600 that may be implemented as an application or interactive displayable content. The user interface 600 may include selection elements, menus, buttons, and other interactive features to allow a user to configure outgoing communications. In one embodiment, the user interface 600 includes selection elements 602, 604, and 606, a network address book 608, selection elements 610 and 612, a call log 613, a text sent 614, a call sent 616, or an unable to contact 618. The selection elements 602, 604, 606, 610, and 612 may be icons, indicators, portions of a touch screen, or other interactive elements for displaying information and data to a user and receiving user input.

The user may configure outgoing communications utilizing selection element 602 to determine the communication type, live call or recorded message. The choice to make a live call by activating the selection element may lock out other features such as sending recorded messages to simplify the process, prevent inadvertent commands, and clarify the ongoing processes for the user.

The selection element 604 may allow a user to select a previously recorded message after they choose to send out a recorded message with selection element 602. The user may utilize the selection element 604 to browse electronic storage locations for the recorded message. The user may also choose to record a new message using selection element 606. The recording of a new message may be controlled through the use of buttons or another suitable interactive element that may allow the user to configure the recording.

The network address book 608 may display all of a user's contacts or a selected group of contacts. The user may view all known contacts and categorize each as work or personal. Additionally, the user may assign a priority level to each contact. A high priority level may automatically put the selected contact at the top of the network address book 608, call list, or call sequence. For example, the portal application may be activated while a user is in a meeting. During the meeting period the portal application may be set to receive all incoming communications and store them in the network address book for a reply communication. The contacts may be ordered according to user designated priority. The user may then select which contacts to call or send messages to manually. The network address book may be configured not to display any unknown incoming communications. Using the network address book 608 may allow a user to compile a call or message list. Once a call or message list is compiled a user may begin the dialing or communication process using selection element 610. At any time the user may end the dialer process by activating selection element 612.

Once a communication is completed, the call or message may be stored in the call log 613 under text sent 614, call sent 616, or unable to contact 618. The call log 613 may display the time of communication and the contact information to allow a user to easily access a communications record in the future. The call log may also include the call status, such as completed, not answered, busy, email sent, video message sent, text message sent or other. For example, the status of "busy" may indicate additional communications are attempted when the line is available as previously described. The call log may also list the call disposition, such as, call completed, cancelled by originator, not answered, busy, email sent, text message sent, and so forth.

The user interface 600 may also be configured to exclude any unknown numbers from call lists that are compiled from missed communications. The user may also be able to research the unknown numbers or call them as needed so that the unknown numbers may be added to the address book, blocked, or otherwise managed.

In one embodiment, the user interface 600 may also allow a user to specify how often calls are to be made. For example, a user may not want to make all calls back to back. The user may select that once a call is completed a configurable time interval of minutes will pass before the next contact on the call list is dialed.

The user interface 600 may also be configured to only allow a certain type of communication to be made depending on the time of day. For example, a user may specify that after six in the evening only messages will be sent, no calls.

The user interface 600 may also allow a user to link the portal application to an electronic calendar program. A link to a calendar program may allow contacts to be added to a call or message list automatically. For example, a user may input a contact's name into a locally stored email application, the email application may include an add-on that alerts the portal application to add the contact's name to the network address book 608 and include the user in a call list for that day. A link to or an integrated calendar program may allow the user the ability to pre-record a voice message, text message, email, video mail, or other electronic communication and have the communication sent out on a specified date and time. The calendar program may monitor the date and time, and when a communication is scheduled, send a command to the portal application to initiate the scheduled communication. The calendar program allows the user to pre-record a voice or multimedia message and deliver this message using the portal application at the predetermined time, as initiated by the calendar.

In another embodiment, the user interface 600 may present a series of setup or configuration screens to the user. The user may be prompted to provide a number of selections or input to progress to the point of initiating or scheduling communications with one or more parties. For example, in the first screen the user may enter login information. In another screen, the user may specify whether to implement a call or message. If a call or message is implemented the user may be required to select between a live or recorded message. The user may also be prompted to identify a call list or contact schedule for later reference or to modify the session as needed.

Another screen may list the contacts that are included in the call list or session. The user may select to add or remove contacts by using check marks or other indicators. The user may select a notification or alert before initiating a call. Another screen may present a user with a date and time selection to initiate the call. The user may also select to initiate the communications immediately. A final screen may display a summary or details of the call list before creating the contact schedule. At any time the user may view a list of contact schedules that have been configured. The user may click on a link to the session identification to modify or cancel the contact schedule.

The previous detailed description is of a small number of embodiments for implementing the invention and is not intended to be limiting in scope. The following claims set forth a number of the embodiments of the invention disclosed with greater particularity.

What is claimed:

1. A method for coordinating communications, the method comprising:
    identifying phrases in contents of received communications;
    automatically presenting, through a web portal, a user with contacts from the received communications in a priority order designated by the user, in response to determining that the contents of the received communications include the phrases;
    receiving, with the web portal, a user selection of a plurality of the contacts from the received communications;
    adding the user selection of a plurality of contacts from an address book;
    automatically calling, with a session initiation protocol ("SIP") servlet of the web portal, the plurality of contacts listed in the contact schedule in the priority order designated by the user;

initiating, with the SIP servlet, a voice communication in response to a receiving party answering a call; and sending, with the SIP servlet, a message specified by a user to the receiving party in response the receiving party not answering the call.

2. The method according to claim 1, further comprising:
receiving the message based on a selection by the user or user input.

3. The method according to claim 2, wherein the receiving further comprises:
recording a message from the user.

4. The method according to claim 2, wherein the receiving further comprises:
receiving a selection of the specified message from an existing message.

5. The method according to claim 1, further comprising:
re-dialing the receiving party in response to a phone of the receiving party becoming available to receive the voice communication; and
receiving a time period for spacing one or more calls to the plurality of contacts on the contact list.

6. The method according to claim 1, further comprising:
determining a type of communications the plurality of contacts may receive.

7. The method according to claim 6, further comprising:
automatically calling or sending the specified message based on the determination.

8. The method according to claim 6, wherein the type of communication is a voice call, a voice message, an email, a text message, a video message, and a chat message.

9. The method according to claim 1, further comprising:
scheduling a time for implementing the contact schedule;
receiving user input of a name and a description for the contact schedule.

10. A system for implementing a contact schedule, the system comprising:
a computer that provides a web portal configured to identify phrases in contents of received communications, automatically present, in response to determining that the contents of the received communications include the phrases and in a priority order designated by a user, one or more contacts from the received communications to a user for addition to a contact schedule, receive a user selection of plurality of contacts to add to the contact schedule, the portal application configured to determine a category of communication for each of the plurality of contacts;
wherein the web portal comprises a session initiation protocol ("SIP") servlet configured to initiate calls to the plurality of contacts in the priority order designated by the user to provide voice communication between the user and a receiving party, wherein a message of the category is sent to the receiving party in response to the trigger determining the receiving party is not answering the phone.

11. The system according to claim 10, wherein the SIP servlet connects the call to a telephone in response to the receiving party answering the phone.

12. The system according to claim 10, wherein the portal web portal generates a user interface to receive the user selection and a selection of the message or user input of the message, wherein the user interface accesses any of a directory, a database or an address book storing contact information associated with the plurality of contacts.

13. The system according to claim 10, further comprising:
a calendar application configured to schedule a date and time to initiate the contact schedule, the calendar application adds a contact to the plurality of contacts in response to determining a contact has requested further communication, wherein the calendar application sends the message to the plurality of contacts.

14. The system according to claim 10, further comprising:
a microphone in communication with the portal application configured to record the message.

15. A server configured to implement a plurality of communications comprising:
a processor for executing a set of instructions; and
a memory in communication with the processor, the memory configured to store the set of instructions, wherein the set of instructions are configured to:
provide a web portal comprising a session initiation protocol ("SIP") servlet;
identify phrases in contents of received communications;
automatically insert, with the web portal, one or more contacts from the received communications in a contact schedule in priority order designated by the user, in response to determining that the contents of the received communications include the phrase;
receive, with the web portal, a user selection of plurality of contacts from a network address book;
add the user selection of the plurality of contacts to the contact schedule;
determine a category of communication for each of the plurality of contacts;
automatically call, with the SIP servlet, the plurality of contacts listed in the contact schedule selected for voice communications in the priority order designated by the user, to provide voice communication between the user and the plurality of contacts; and
automatically send, with the SIP servlet a message to the plurality of contacts listed in the contact schedule selected to receive a message.

16. The server according to claim 15, wherein the one or more contacts are inserted in the contact schedule in response to determining the received communications have been flagged, and wherein the set of instructions further saves the contact schedule for future modification.

17. The server according to claim 15, wherein the category includes any of a live call, a voice message, an email, a text message, a video message, and a chat message.

18. The server according to claim 15, wherein the set of instructions verifies that a user is authorized to access the contact schedule, and receives a date and time to implement the contact schedule.

19. The server according to claim 15, wherein the call is initiated in response to determination that a connection associated with the contact is not busy; and wherein the set of instructions waits for a time period before calling a next contact.

* * * * *